United States Patent [19]
Takahara et al.

[11] Patent Number: 5,210,775
[45] Date of Patent: May 11, 1993

[54] π/4 SHIFT QPSK MODULATOR AND COMMUNICATION APPARATUS

[75] Inventors: Yasuaki Takahara; Tomohiro Ezaki; Shigeyuki Sudo; Teiji Okamoto, all of Kanagawa, Japan

[73] Assignee: Hitachi, Ltd., Tokyo, Japan

[21] Appl. No.: 653,895

[22] Filed: Feb. 12, 1991

[30] Foreign Application Priority Data

Feb. 13, 1990 [JP] Japan ................................... 2-29579

[51] Int. Cl.$^5$ ............................................ H04L 27/20
[52] U.S. Cl. ....................................... 375/67; 332/103
[58] Field of Search ...................... 375/54, 67; 455/23, 455/110; 364/736.5; 332/103

[56] References Cited

U.S. PATENT DOCUMENTS 4,327,439  4/1982  Göcker et al. ..................... 375/54 X
4,962,510 10/1990  McDavid et al. .................... 375/67

Primary Examiner—Curtis Kuntz
Assistant Examiner—Tesfaldet Bocure
Attorney, Agent, or Firm—Antonelli, Terry, Stout & Kraus

[57] ABSTRACT

A π/4 shift QPSK modulator for receiving digital signals and for outputting a modulated signal therefrom in accordance with each of the inputted digital signals. The π/4 QPSK modulator is utilized in a communication apparatus and includes a counter for counting the number of the inputted digital signals, a phase information arithmetic unit for receiving a value of an output from the counter and a value of each of the inputted digital signals for outputting phase information of the signal to be modulated, an arithmetic unit for performing an arithmetic operation on values representing an impulse response of the output phase information from the phase information arithmetic unit and outputting impulse response values in accordance therewith, and an accumulating unit for accumulating impulse response values outputted from the arithmetic unit and for performing an arithmetic operation for enabling generation of a π/4 shift QPSK modulated signal.

15 Claims, 11 Drawing Sheets

π/4 SHIFT QPSK MODULATOR AND COMMUNICATION APPARATUS

BACKGROUND OF THE INVENTION

The present invention relates to a communication apparatus employing a digital signal, and particularly to a π/4 shift QPSK modulator suited for reducing the circuit scale and for integrating the components into circuits and to a communication apparatus used therewith. Heretofore, a QPSK system has widely been used as a digital signal modulation system. In the QPSK system, there is the possibility that a phase vector passes through a zero point when the phase of the digital signal varies. A problem is therefore encountered with such a system in a radio communication system that there is a high possibility of deteriorating the S/N ratio. In order to solve such a problem, a π/4 QPSK modulation system has been proposed wherein an axis for shifting the phase of data is rotated for each symbol to avoid the passage through the zero point. This system is generally described in the article entitled "Highly Efficient Digital Mobile Communications with a Linear Modulation Method" by Akaiwa et al, IEEE Journal on Selected Areas in Communications, pp. 390-395, Vol. SAC-5, No. 5, June 1987, but the article does not provide a detailed description sufficient to construct the system.

Figure 4:
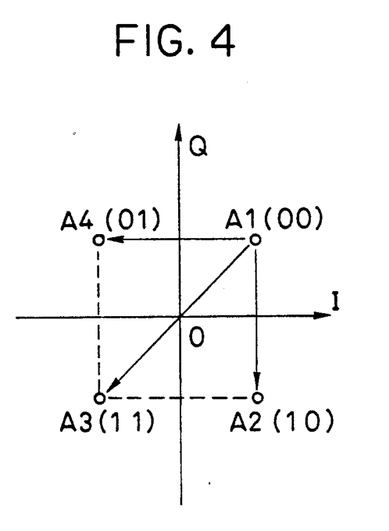
FIG. 4 is a diagram depicting a state of transition of the phase of a QPSK signal.
Figure 20:
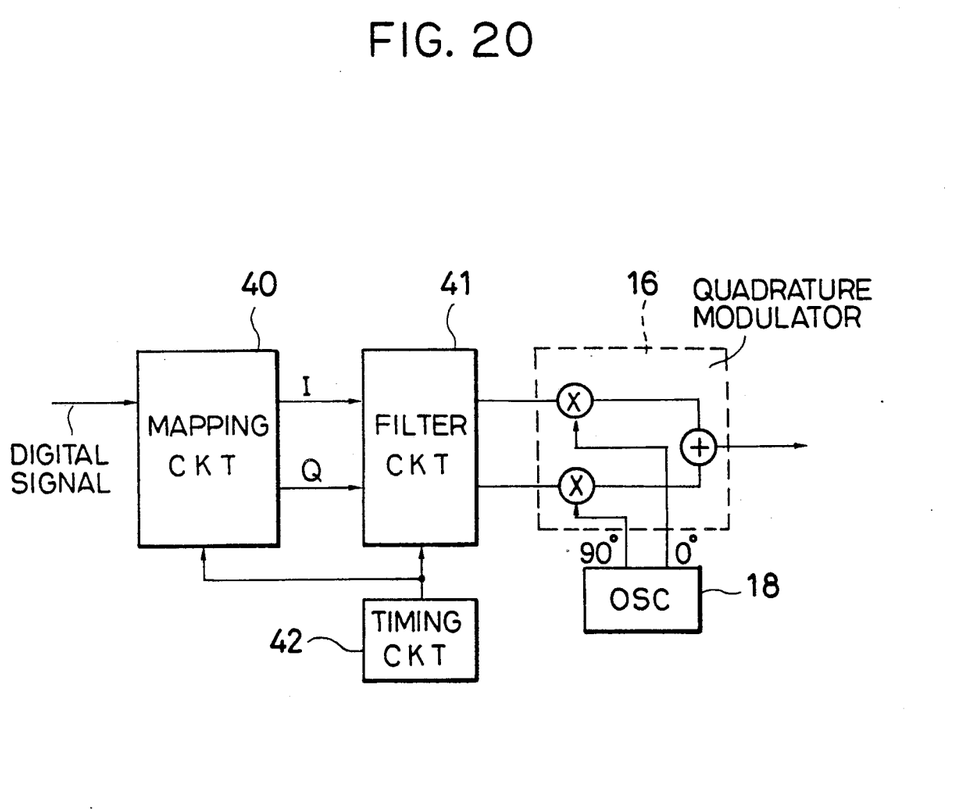
FIG. 20 is a block diagram of a QPSK modulator.

FIG. 4 is a diagram showing the phase of data subjected to QPSK modulation. FIG. 20 is a block diagram depicting the structure of a conventional QPSK modulating circuit which includes a mapping circuit 40 for calculating components (hereinafter called "phase information") of I and Q which intersect each other at right angles from 2-bit digital signals, a filter circuit 41 for cutting off a high-frequency component of the phase information to subject the same to band-limitation and a normally-used cross or quadrature modulator circuit 16 coupled to an oscillating circuit 18. The inputted digital signals are disposed in four phase positions in the mapping circuit 40 as shown in FIG. 4. More specifically, the phase information (I, Q) corresponding to each phase is outputted from the mapping circuit 40. The high-frequency components of the phase information are cut off to be band-limited in the filter circuit 41. A filter having a roll-off characteristic is normally employed in the filter circuit for canceling out the interference between codes. Since the roll-off filter has a complicated characteristic, a digital filter is often used. It is necessary to execute an arithmetical operation on a signal at high speed because this digital filter performs the processing on the signal by multiplication and addition operations. For this purpose, difficulties are encountered with an apparatus to be operated by a battery such as a portable transceiver in view of the power to be consumed.

Figure 3:
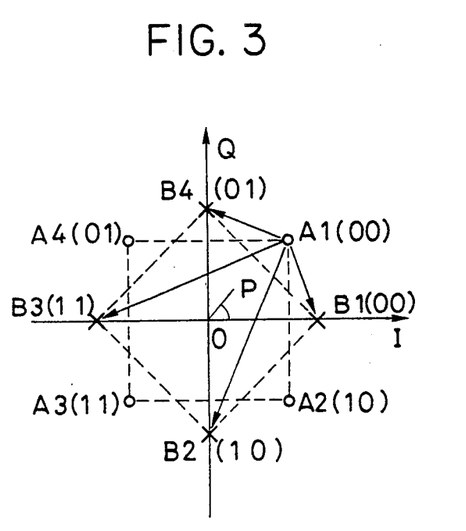
FIG. 3 is a diagram depicting a state of transition of the phase of a $\pi/4$ shift QPSK signal.

In order to overcome such a problem, a technique has been proposed that the filter circuit and additionally the quadrature modulator circuit are replaced with a ROM by storing the results of arithmetical operations in the ROM, in advance, and providing input data as addresses for the ROM as described in Japanese Patent Application Laid-Open No. 24763/1978. This technique makes the complicated structure of the processing circuit and the requirement for executing the data processing at high speed unnecessary. Although the aforementioned prior art omits complicated multiplication and addition circuits and therefore makes the performing of an arithmetical operation on a signal at high speed unnecessary, no consideration has been given to the processing corresponding to the phase shifting as the transition of a state of the phase of the π/4 shift QPSK signal as shown in FIG. 3. Further, the prior art is accompanied by the drawback that the capacity of the ROM is exponentially increased in accordance with the number of taps of the filter and the number of phase states thereof.

SUMMARY OF THE INVENTION

It is an object of the invention to provide a π/4 shift QPSK modulator which overcomes the drawbacks of the prior art, reduces the circuit scale and the storage capacity of a ROM and is suitable for integrating of components into circuits, and to provide a communication apparatus used therewith.

In accordance with the present invention a π/4 shift QPSK modulator and communication apparatus is provided for receiving digital signals and for outputting a π/4 shift QPSK modulated signal in accordance with each of the digital signals including a counter for counting the number of the inputted digital signals, a phase information arithmetic unit for receiving a value of an output from the counter and a value of each of the inputted digital signals so as to output phase information of the signal to be modulated, an arithmetic unit for performing an arithmetical operation on values representing an impulse response of the phase information, and an accumulator for accumulating impulse response values outputted from the arithmetic unit and for performing an arithmetical operation for enabling generation of the π/4 shift QPSK modulated signal. According to features of the present invention, the phase information arithmetic unit shifts phase points of a signal to be modulated π/4 by π/4 based on a value counted by the counter and the arithmetic unit and accumulator provide outputs in accordance therewith, wherein the phase information arithmetic unit and the arithmetic unit utilize a ROM. The arithmetic unit includes a ROM and a numeric converting unit for performing code inversion on the result of the arithmetical operation outputted from the ROM or converting the same into a preset value in accordance with an inputted signal. There is also provided a control unit for providing a control signal for resetting the counter and including a first storage unit for storing control information therein, an output controller for controlling the output level or off-set level of an output signal in accordance with the control information stored in the first storage unit The output controller includes a second storage unit for storing a series of control information which has been preset, a reading unit for sequentially reading the control information from the second storing unit and a control switching arrangement for performing the switching on either control of said reading unit based on the control information stored in said first storage unit or control of the same based on the control information read from said second storage unit for controlling the operation of said reading unit.

In accordance with the present invention, the phase information arithmetic unit performs the processing for causing the phase point of the modulated signal to be shifted π/4 by π/4 based on the value obtained by counting the number of the inputted signals with the counter. It is therefore possible to calculate an accurate phase position since the arithmetic unit performs the arithmetical operation on the values representing the impulse response of the phase information and the accumulator integrates the impulse response values outputted from the arithmetic unit thereby obtaining the output value of the modulated signal. The amount of the arithmetical operation effected by the arithmetic unit can be subjected to dispersion and the storage capacity of the ROM can be reduced even when a ROM is utilized for the arithmetic unit.

Even in the case where an arithmetical operation on address information is repeated while sequentially changing tap positions determined by a tap calculation or the like, an address arithmetic unit can calculate the amount of the phase shifting in accordance with the tap positions thereby enabling an change in the address correspondingly, by employing the ROM in the arithmetic unit and calculating the address information in the ROM based on the information inputted to the phase information arithmetic unit by way of the address arithmetic unit.

Since the result of the arithmetical operation outputted from the ROM in the arithmetic unit can be subjected to code inversion or converted into the preset value by the operation of the numeric converting unit in accordance with the signal inputted from the arithmetic unit, a numerical arithmetic coefficient or symmetry of the phase information is available and the storage capacity of the ROM can be reduced. Further, the phase state at the time of a start in the delivery of data is enabled to start from a constant state because the counter can be reset in accordance with the control signal by the counting controller.

Further, since the output level or off-set level of the output signal from the output controller can be controlled in accordance with the control information stored in the first storage unit, the control of the quadrature modulating circuit can easily be effected. Additionally, since the output level or off-set level of the output signal from the output control unit can be controlled by using the value representative of the control information sequentially read out from the second storage unit by the reading unit as well as the value indicative of the control information stored in the first storage unit, a high-speed on-off control for the transmission of power, which is effected under the control of TDMA or the like, is enabled smoothly.

These and further objects, features and advantages of the present invention will become more obvious from the following description when taken in connection with the accompanying drawings which show for purposes of illustration only, several embodiments in accordance with the present invention.

DETAILED DESCRIPTION OF THE PREFERRED EMBODIMENTS

Figure 1:
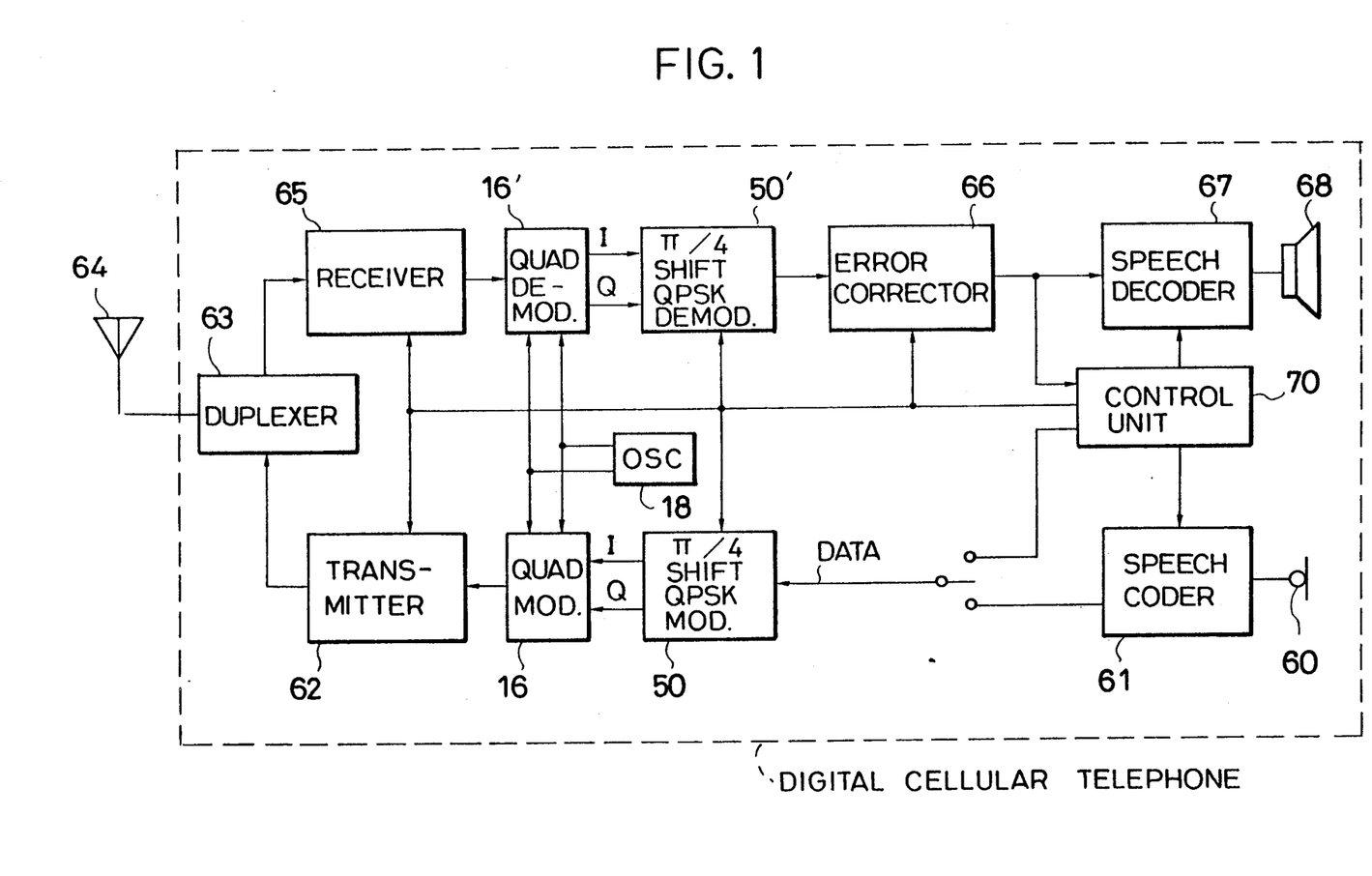
FIG. 1 is a block diagram of a communication apparatus in accordance with the present invention.

Referring now to the drawings wherein like numerals are utilized to designate like parts throughout the several views, FIG. 1 illustrates in block diagram form a communication apparatus such as a digital cellular telephone utilizing a $\pi/4$ shift QPSK modulator 50 in accordance with the present invention in which, for transmission, a microphone 60 is coupled to a speech coder 61 for supplying input data to a $\pi/4$ shift QPSK modulator 50 supplying output signals to a quadrature modulator 16 coupled to a transmission circuit 62 and a duplexer 63 provides an output to an antenna 64. For reception, the signal received by the antenna is coupled via the duplexer and a receiver circuit 65 to a quadrature demodulator 16', a $\pi/4$ shift QPSK demodulator 50', an error correction circuit 66, a speech decoder 67 and a speaker 68. As shown, a control circuit 70 is coupled to the speech coder and decoder and an oscillator 18 is coupled to the quadrature modulator and demodulator.

Figure 2:
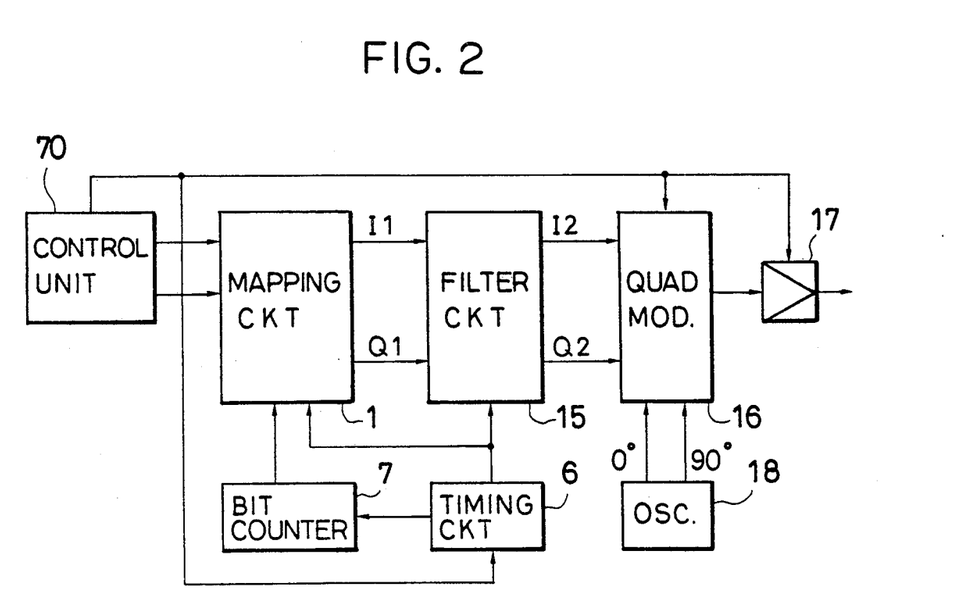
FIG. 2 shows a block diagram of a $\pi/4$ shift QPSK modulator for a transmission unit in accordance with the present invention.

FIG. 2 shows one embodiment of a data transmission unit for a communication apparatus and includes a control unit 70, a mapping circuit 1, a filter circuit 15, a quadrature modulator circuit 16, a linear amplifier 17, a bit counter 7, a timing circuit 6 and an oscillator 18. The control unit 70 outputs control signals to respective circuits for controlling the production and output of data to be transmitted and for control of the operation of the communication apparatus. The quadrature modulator circuit 16 has a construction as shown in FIG. 20.

The timing circuit 6 generates each of signals used as a criterion for the operation of each unit. The bit counter 7 counts the number of bits of digital data outputted from the control unit 70. In the present embodiment, the phase of a $\pi/4$ shift QPSK signal is shifted $\pi/4$ by $\pi/4$ clockwise each time a symbol is inputted, as shown in FIG. 3, and hence eight types of phase shift states are present. Therefore, the bit counter 7 is constructed as a 3-bit counter. When the bit counter 7 counts the numbers 0 to 7, then it counts the number 0 again. The mapping circuit 1 is supplied with the digital data from the control unit 70 and an output from the bit counter 7 to determine a phase state corresponding to a value of the data and a value counted by the counter 7, thereby outputting phase information I1 and Q1. The filter circuit 15 cuts off high-frequency components of the information I1 and Q1 supplied thereto and provides the outputs I2 and Q2 thereof to the quadrature modulator circuit 16. The linear amplifier 17 amplifies a modulated wave produced by the quadrature modulator circuit 16 and outputs the same to a communication line (not shown) or a communication line I/F (not shown).

Figure 5:
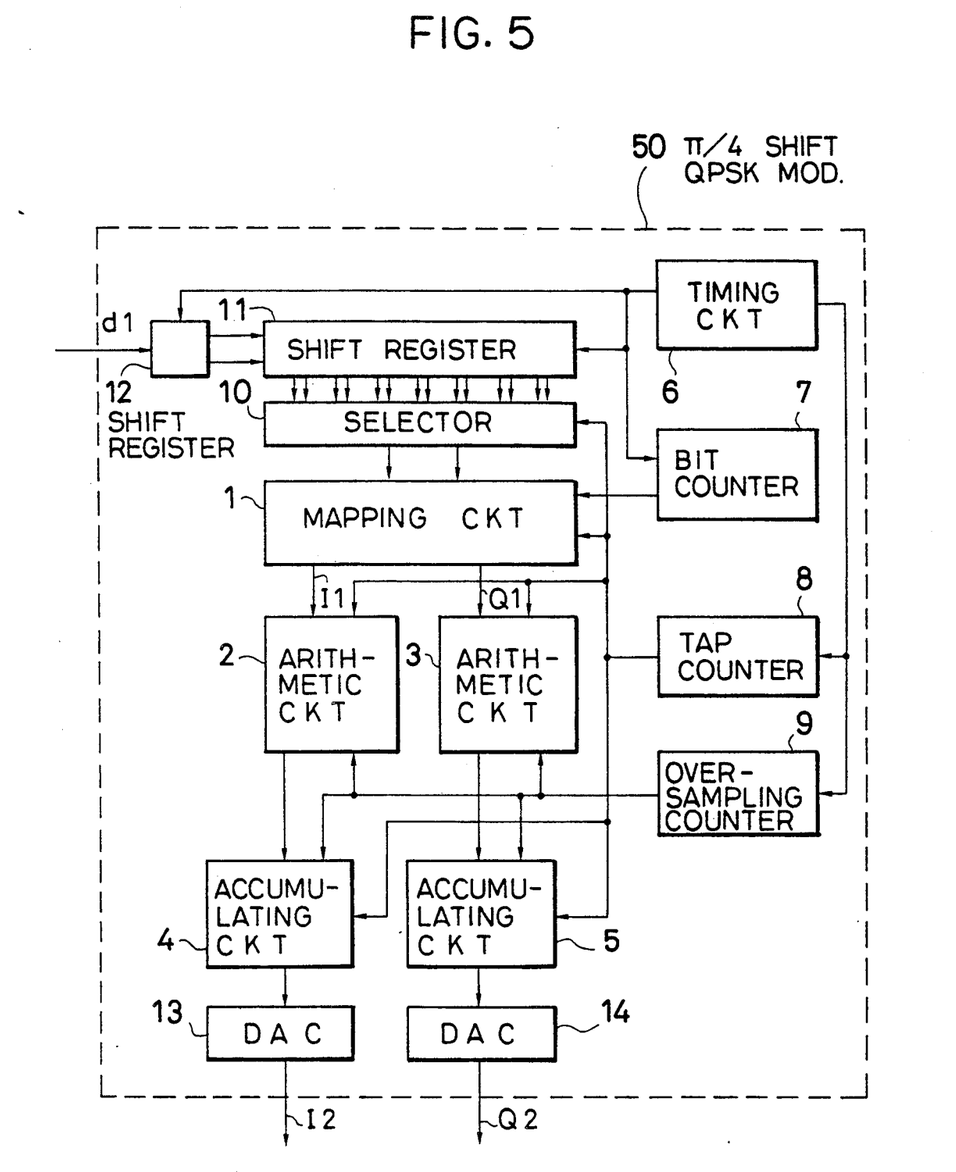
FIG. 5 is a more detailed block diagram of a $\pi/4$ shift QPSK modulator in accordance with an embodiment of the present invention.

FIG. 5 is a block diagram showing a more detailed structure of the mapping circuit 1 and the filter circuit 15 shown in FIG. 2. Referring to FIG. 5, there are shown a mapping circuit 1, a bit counter 7, a timing circuit 6, a tap counter 8, an over-sampling counter 9, a data selector 10, a 2-bit 7-stage shift register 11, arithmetic circuits 2, 3, accumulating circuits 4, 5 and D/A converters (hereinafter abbreviated "DAC") 13, 14. The above circuits 2 to 5 and 8 to 14 correspond to the filter circuit 15 shown in FIG. 2, which constitute a digital filter in which the number of stages of the shift register 11 is regarded as being the number of taps.

A signal d1 which is digital data of NRZ is outputted from the control unit 70 (not shown). The signal d1 is converted into 2-bit data as the transmission unit of QPSK. The transmission unit is represented as a symbol in the subsequent description and 2 bits will be regarded as one symbol. An output from the shift register 12 is applied to the shift register 11 in the form of the symbol unit. In the present embodiment, since the number of taps of the digital filter is set to 7, the number of stages of the shift register 11 is also set to 7. As is apparent, the present invention is also applicable when the number of taps is changed. The data selector 10 selects one symbol from data outputted from the shift register 11 in response to each of values outputted from the tap counter 8 to output the same to the mapping circuit 1. The mapping circuit 1 is supplied with data from the data selector 10 and each of values outputted from the bit counter 7, and is also supplied with each of the values outputted from the tap counter 8 with a view toward calculating the amount of phase shift in accordance with the positions of taps, to determine a phase state based on these respective values and thereby outputting phase information I1, Q1. The arithmetic circuit 2 performs an arithmetical operation on the impulse response of the phase information I1 and applies the result to the accumulating circuit 4. The accumulating circuit 4 adds together impulse response values sequentially outputted from the arithmetic circuit 2 over all of the taps and thereafter outputs the result of addition to the DAC 13. The DAC 13 converts the inputted digital data into analog data to output the same therefrom as phase information I2. The circuits, 3, 5 and 14 operate in a similar manner for receiving the phase information Q1 and outputting the phase information Q2.

Figure 6:
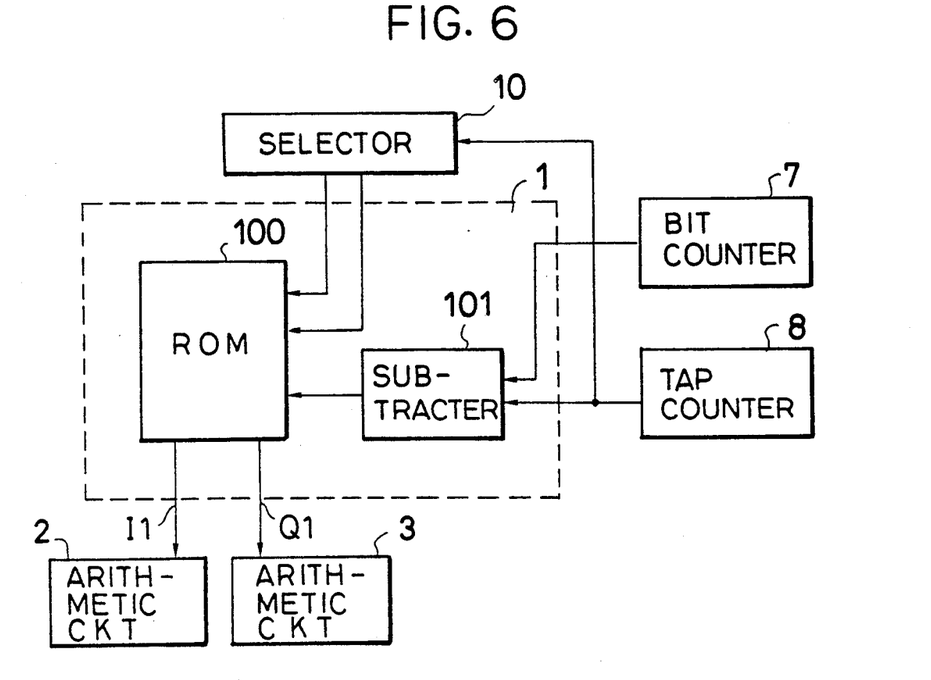
FIG. 6 is a more detailed block diagram of a mapping circuit in accordance with the present invention.

FIG. 6 is a block diagram showing a more detailed structure of the mapping circuit 1 including a ROM 100 and a subtracter 101. The ROM 100 is supplied with symbol data from the selector 10 and respective values of the bit counter 7 and the tap counter 8 as addresses, and correspondingly outputs the phase information I1 and Q1, which have been stored in advance in memory. The subtracter 101 outputs the difference between the value counted by the bit counter 7 and the value counted by the tap counter 8. One example of the contents in the ROM 100 is shown in Tables 1 and 2.

TABLE 1

| Output of Subtractor 101 | Value of Symbol | | | |
|---|---|---|---|---|
| | 00 | 01 | 10 | 11 |
| 0 | A1 | A4 | A2 | A3 |
| 1 | B1 | B4 | B2 | B3 |
| 2 | A2 | A1 | A3 | A4 |

TABLE 1-continued

| Output of Subtractor 101 | Value of Symbol | | | |
|---|---|---|---|---|
| | 00 | 01 | 10 | 11 |
| 3 | B2 | B1 | B3 | B4 |
| 4 | A3 | A2 | A4 | A1 |
| 5 | B3 | B2 | B4 | B1 |
| 6 | A4 | A3 | A1 | A2 |
| 7 | B4 | B3 | B1 | B2 |

TABLE 2

| | I1 | Q1 |
|---|---|---|
| A1 | $\alpha$ | $\alpha$ |
| A2 | $\alpha$ | $-\alpha$ |
| A3 | $-\alpha$ | $-\alpha$ |
| A4 | $-\alpha$ | $\alpha$ |
| B1 | 1 | 0 |
| B2 | 0 | $-1$ |
| B3 | $-1$ | $-1$ |
| B4 | $-1$ | 0 | where $\alpha = \cos 45°$

Table 1 represents values of symbols, and outputs from the subtractor 101 and the phase states of the outputs therefrom. The number representing the state of phase in Table 1 is the same as that shown in FIG. 3. Table 2 represents the relation between the phase state and the phase information I1, Q1. As is apparent from Table 2, the phase information I1 and Q1 both include five type of values alone. Therefore, the numeric values of 1 to 5 are assigned and stored in the ROM corresponding to the respective values referred to above in the present embodiment.

The relation between the bit counter 7 and the tap counter 8 will now be described by way of an illustrative example. As is well known, in a digital filter, its characteristic has been effected by calculating the sum of impulse response values of time-delayed signals. In the present embodiment, the time delay of each signal is effected by the shift register ii. In order to calculate the impulse response values of the time-delayed respective signals, the tap counter 8 and the data selector 10 sequentially select each of the signals. Then, the accumulating circuit 4 adds together the impulse response values calculated by the arithmetic circuit 2 to calculate a filter output based on the result of addition.

Table 3 shows one example in which a bit string (11110100101100) is given as an input. Since the bit processing is effected in the form of a 2-bit unit in the present embodiment, the bit counter 7 also counts the number of bits in the form of the 2-bit unit. As a matter of course, the number of bits may be counted in the form of a 1-bit unit and thereafter the counted value may be divided into ½. Table 3 shows the relation among values counted by the bit counter at the time of input of signals, the number representing the phase state corresponding to each of the signals, a value counted by the bit counter after all the signals have been inputted, values counted by the tap counter when the data selector 10 selects values of the respective signals, values of outputs from the subtracter 101, and the phase state represented by each of the phase information I1, Q1 to be read from the ROM 100. In the present embodiment, the signal finally inputted to the tap counter 8 is defined such that the output of the tap counter 8 is selected as 0. Hereinafter, the values counted by the tap counter 8 are increased in retroactive order. Thus, if the value counted by the tap counter is 4 by way of example, the data selector 10 selects data inputted prior to four data.

TABLE 3

| | Upon input of data | | | | | | |
|---|---|---|---|---|---|---|---|
| Input data | 11 | 11 | 01 | 00 | 10 | 11 | 00 |
| Values counted by bit counter | 1 | 2 | 3 | 4 | 5 | 6 | 7 |
| Phase state | B3 | A4 | B1 | A3 | B4 | A2 | B4 |
| | Upon input of all the data | | | | | | |
| Value counted | | | | 7 | | | |
| Values counted by tap counter | 6 | 5 | 4 | 3 | 2 | 1 | 0 |
| Output values of subtracter 101 | 1 | 2 | 3 | 4 | 5 | 6 | 7 |
| Outputs of ROM (Phase state) | B3 | A4 | B1 | A3 | B4 | A2 | B4 |

When the data is inputted to the bit counter 7, it counts the number of data. Assuming that the value to be counted by the bit counter is 1 at the time of input of initial data (11) by way of example, the value counted by the bit counter becomes 2 when the subsequent data (11) is inputted. Since the finally-inputted signal is selected when the value counted by the tap counter 8 is 0, the value outputted from the bit counter 7 is inputted to the ROM 100 as it is. Thus, the mapping circuit 1 treats the initial data (11) as the phase state B3 and the following data (11) as the phase state A4. Therefore, the mapping circuit 1 can output the phase information I1, Q1 corresponding to each of the above phase states. In addition, when data of seven symbols mentioned by way of example are inputted, the value counted by the bit counter 7 becomes 7.

Consider now the output of the mapping circuit 1 by changing the value counted by the tap counter 8. For this case, the finally-inputted data is first selected when the value counted by the tap counter is 0, and hence the phase information I1, Q1 corresponding to the phase state B4 is outputted from the ROM 100. When the value counted by the tap counter becomes 5, the second inputted data (11) is selected. At this time, the value of the output of the subtracter 101 is 2, and hence the phase information I1, Q1 is outputted from the ROM 100. This phase state is the same as at the time of input of that data. It is therefore found that the mapping has accurately been effected. Similarly, when the value counted by the tap counter is 6 and the initially-inputted data is selected, the output value of the subtracter 101 becomes 1, so that the phase information corresponding to the phase state B3 is outputted from the ROM 100.

As described above, since the information about the number of bits counted by the bit counter 7 can be used as that corresponding to the phase state determined by the mapping circuit 1, the amount of phase shift and the phase state corresponding to the data can accurately be determined even with respect to $\pi/4$ shift QPSK in which the phase of the data is shifted $\pi/4$ by $\pi/4$ each time the bit is outputted. In addition, the processing of the tap information can also be carried out accurately owing to the operation of the subtracter 101 as an address arithmetic device. Although the subtracter has been used as the arithmetic device in the present embodiment, an adder, a conversion memory and others may be used if they are arithmetic devices capable of determining the phase state from the relation between the tap counter and the bit counter.

Figure 7:
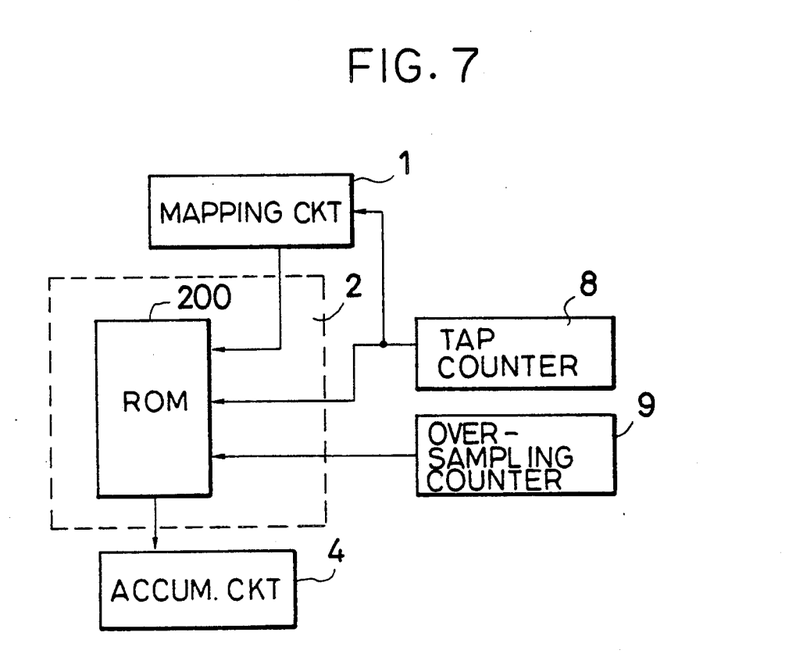
FIGS. 7 and 9 are more detailed block diagrams of different embodiments of an arithmetic circuit.

A description will now be made of the structure and the operation of the arithmetic circuit 2. The arithmetic circuits or units 2 and 3 are structurally identical to each other. FIG. 7 is a block diagram showing the structure of a first example of the arithmetic circuit 2. In the present embodiment, impulse response values are stored in a ROM 200, in advance, and the ROM 200 is supplied with, as addresses, phase information from the mapping circuit 1, a value counted by the tap counter 8 and a value counted by the over-sampling counter 9 and outputs corresponding impulse response values.

Figure 8:
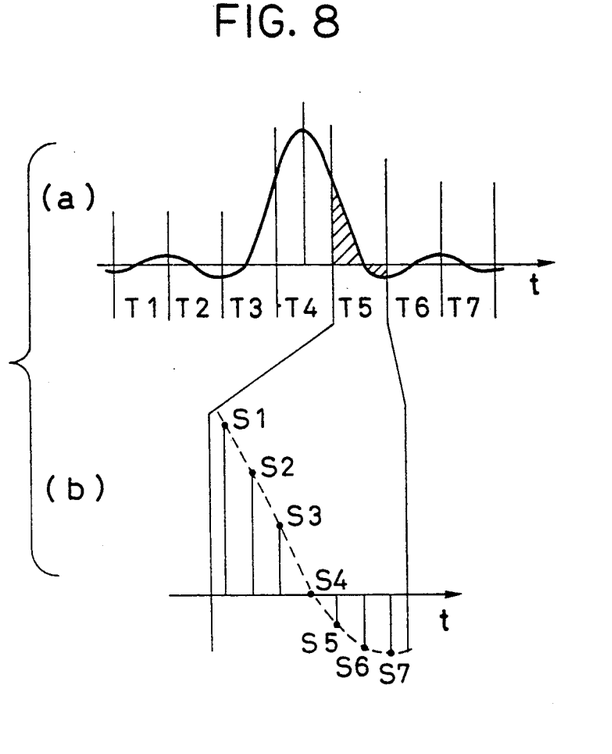
FIG. 8 is a graphic representation of the relation between impulse response values and counted values.

FIG. 8 is graphic representation showing the relation between the impulse response values and the values counted by the respective counters. FIG. 8(a) shows the impulse response given during intervals of seven symbols and FIG. 8(b) is an enlarged view of a characteristic of the impulse response at an interval T5 in FIG. 8(a). The contents of the ROM 200 are set in advance such that the intervals of T1 to T7 in FIG. 8(a) are selected by the values counted by the tap counter 8, respectively, and S1 to S7 are selected by the values counted by the over-sampling counter 9, respectively. Since the impulse response shown in FIG. 7 of course varies even with the phase information inputted from the mapping circuit 1, the impulse response value corresponding to the type of the phase information is set in the ROM 200. As a consequence, the impulse response value corresponding to the phase information is outputted from the arithmetic circuit 2.

Figure 9:
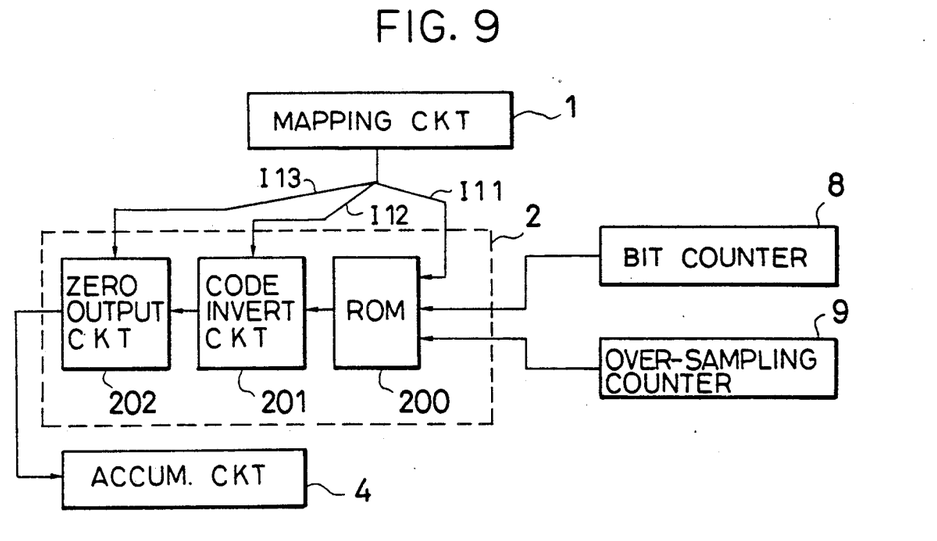

FIG. 9 is a block diagram showing the structure of a second example of an arithmetic circuit 2. Numeral 201 indicates a code inverting circuit which converts an output value from the ROM 200 into a negative value, and numeral 202 indicates a zero output circuit for setting an output value of the arithmetic circuit 2 to 0. In the example shown in FIG. 9, outputs from the mapping circuit 1 are set as represented in Table 4.

TABLE 4

| Values of phase information | Output signal of mapping circuit 1 | | |
|---|---|---|---|
| | I11 | I12 | I13 |
| 1 | 1 | 0 | 0 |
| −1 | 1 | 1 | 0 |
| α | 0 | 0 | 0 |
| −α | 0 | 1 | 0 |
| 0 | X | X | 1 | where $\alpha = \cos 45°$

In addition, impulse response data is set in the ROM 200, in advance, such that the impulse response data corresponding to the input 1 is read out when the value of the signal I11 is 1, and that corresponding to the input cos 45° is read out when the value of the signal I11 is 0. Then, the signal I12 is applied to the code inverting circuit 201. When I12=1, the output value is set so as to be negative. Further, the signal I13 is applied to the zero output circuit 202, and when I13=1, the output value is set so as to be 0. From the above operation, outputs relative to each other shown in Table 4 can be obtained from the arithmetic circuit 2. The present embodiment can bring about an advantageous effect in that the storage capacity of the ROM can be reduced to 2/5 as compared with the embodiment illustrated in FIG. 7, because it is only necessary to store the impulse response data of two types comprising 1 and cos 45° in the ROM 200.

Figure 10:
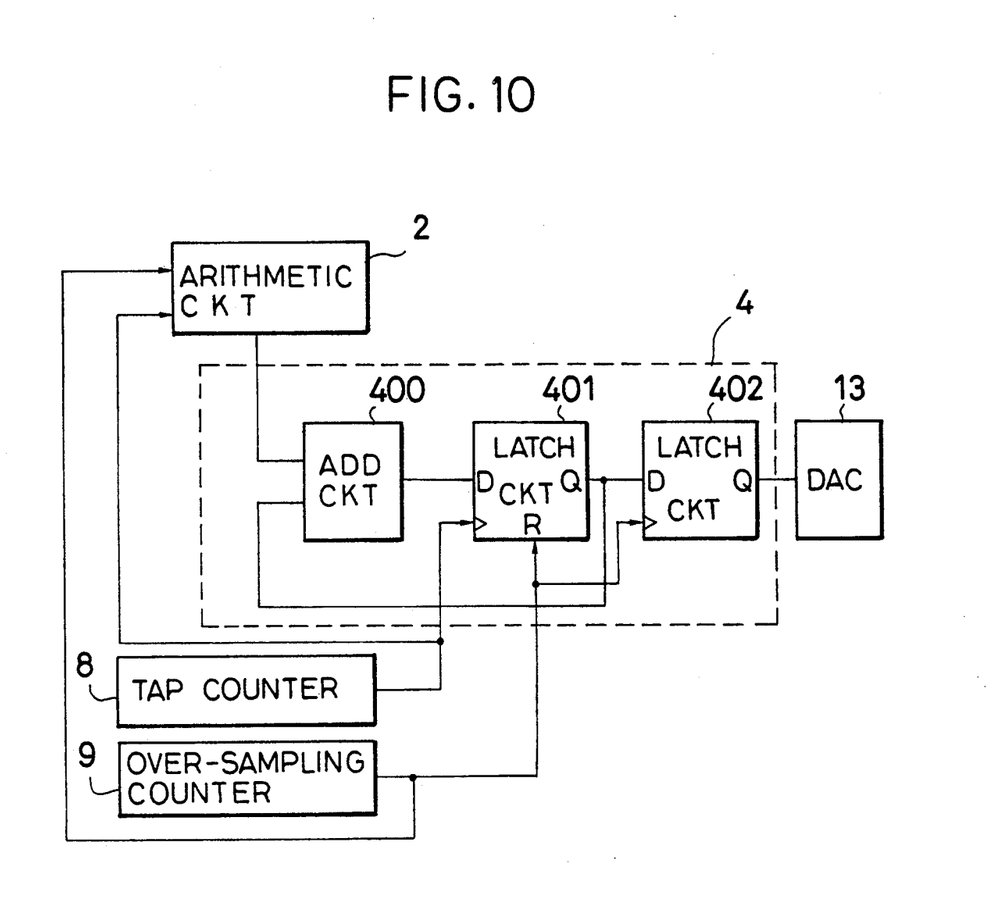
FIGS. 10 and 11 are more detailed block diagrams of different embodiments of an accumulator.

FIG. 10 is a block diagram showing the structure of one example of the accumulating circuit 4 including an addition circuit 400, and latch circuits 401 and 402 for latching data therein, respectively. The latch circuit 401 latches the result of addition from the addition circuit 400 therein. The addition circuit 400 adds together the data held in the latch circuit 401 and data from the arithmetic circuit 2 to output the result of addition therefrom. Based on this arrangement, the result obtained by accumulating the data outputted from the arithmetic circuit 2 can be stored in the latch circuit 401. The latch circuit 402 is used to store therein the result obtained by accumulating data at all the taps and hold therein the output of the latch circuit 401 at the timing at which the over-sampling counter 9 varies. Thereafter, the latch circuit 402 clears the data from the latch circuit 401 to prepare to receive the following calculation.

Figure 11:
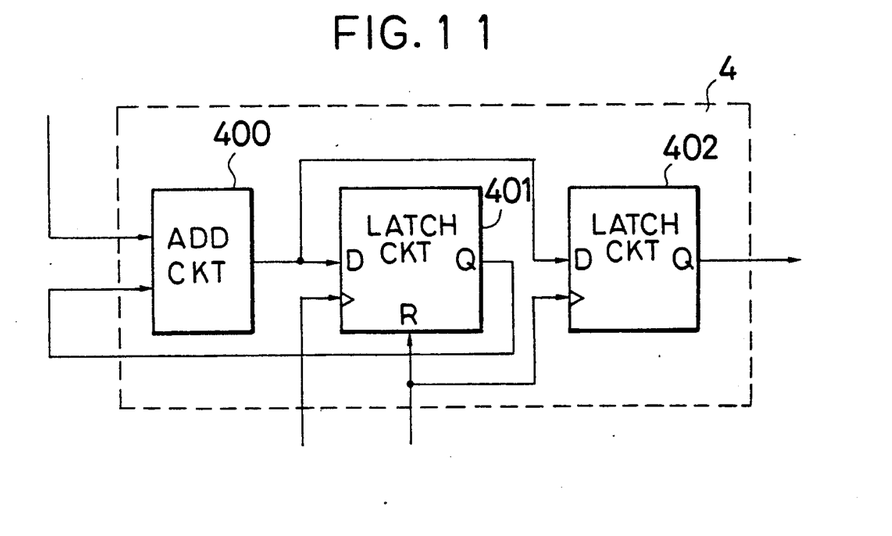

FIG. 11 is a block diagram showing the structure of a second example of the accumulating circuit 4 wherein an output from the addition circuit 400 is directly applied to the latch circuit 402. The example shown in FIG. 11 has an advantageous effect in that a control circuit can be simplified because the accumulating circuit 4 does not malfunction even when the latching of data in the latch circuit 402 and the clearing of data in the latch circuit 401 are effected simultaneously. A description has been made of the accumulating circuit 4 inclusive of the latch circuit 402 therein. However, this latch circuit 402 may be attached to the DAC 13. Also, the accumulating circuit 5 may have a similar structure.

The examples described above are those for describing the embodiment illustrated in FIG. 5 in detail. According to these examples, the arithmetic processing of each of the mapping circuit, the arithmetic circuit and the accumulating circuit can be subjected to dispersion. Therefore, even when the ROM is provided for the arithmetic operation, the storage capacity of the ROM can be reduced and the components in these circuits are easily integrated into circuits.

The phase information signals of two types comprising I and Q are processed in separated circuits in the embodiment shown in FIG. 5. However, the signals may be time-division processed because the arithmetic circuit and the accumulating circuit are structurally identical to each other.

Figure 12:
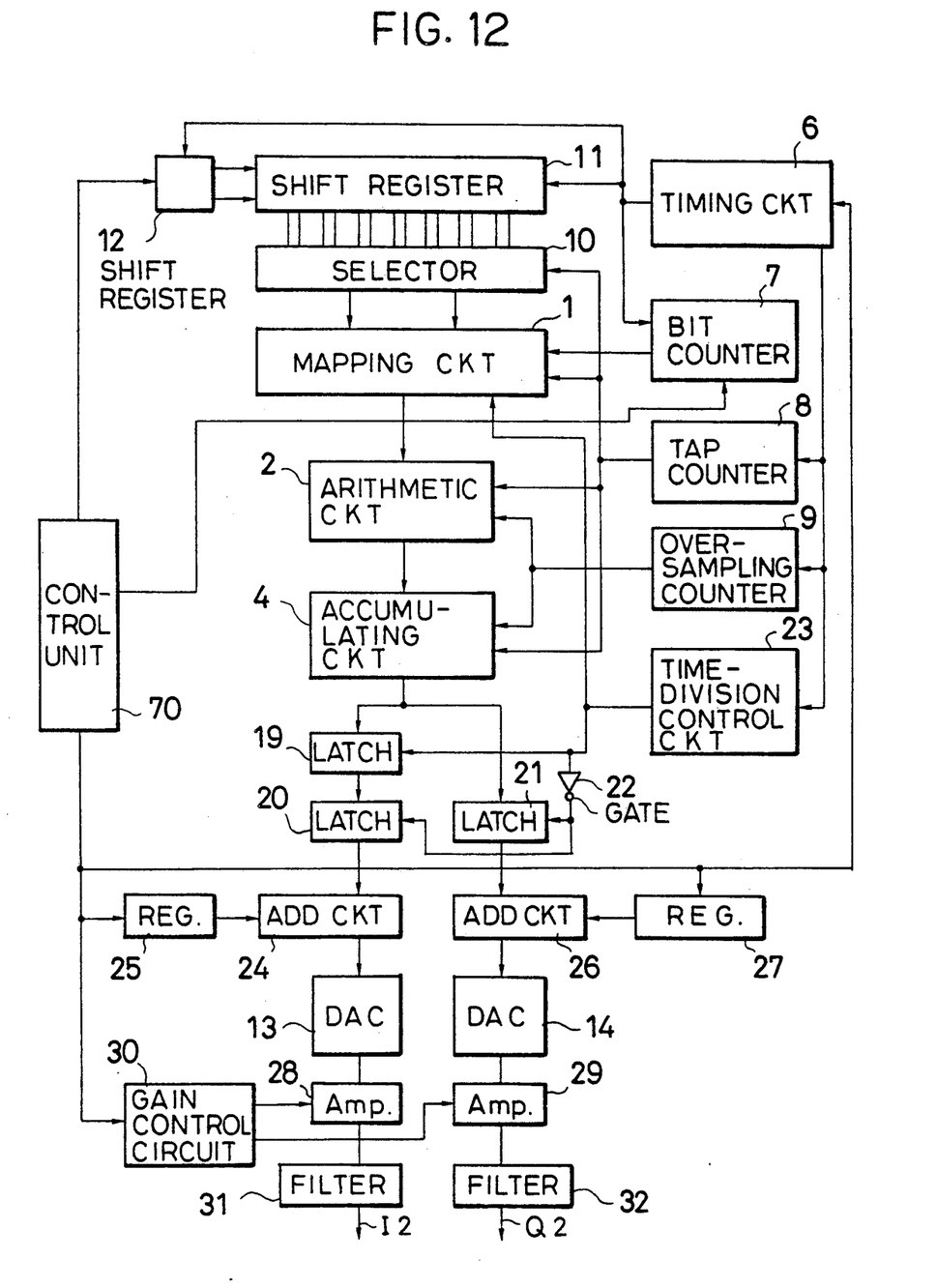
FIG. 12 is a block diagram of another embodiment of a $\pi/4$ shift QPSK modulator in accordance with the present invention.

FIG. 12 shows a second embodiment of this invention in which the phase information I and Q is time-division processed. The second embodiment includes latch circuits 19, 20, 21, a gate 22, a time-division control circuit 23, addition circuits 24, 26, register circuits 25, 27, amplifying circuits 28, 29, a gain control circuit 30 and filters 31, 32 in addition to those employed in the embodiment shown in FIG. 5. Further, the control unit 70 is illustrated in the second embodiment. The respective operations of the arithmetic circuit 2, accumulating circuit 4, bit counter 7, tap counter 8, over-sampling counter 9, shift registers 11, 12, data selector 10 and DACs 13, 14 are the same as those in the embodiment illustrated in FIG. 5.

A feature of the second embodiment illustrated in FIG. 12 resides in that the operation for processing either one of two types of phase information is controlled in accordance with an output from the time-division control circuit 23. The two types of phase information will hereinafter be represented by I information and Q information to be separated from each other. The mapping circuit 1 switches the phase information to be outputted to either I information or Q information in response to the output from the time-division control circuit 23. The arithmetic circuit 2 and the accumulating circuit 4 each calculate the value of impulse response corresponding to each phase information. Since the output of the time-division control circuit 23 has been applied to the latch circuits 19, 20, 21, and the latch circuits 19 and 20 have the opposite polarity from each other, the I information is latched in the latch circuit 19, whereas the Q information is held in the latch circuit 21.

Figure 13:
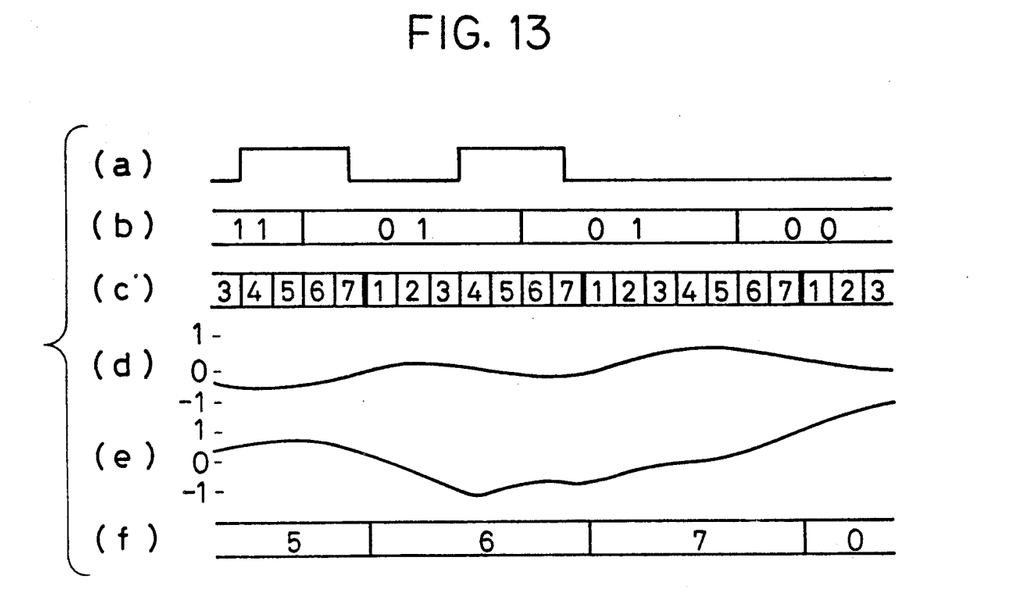
FIGS. 13 and 14 are timing charts for describing the operation of the embodiment shown in FIG. 12.

FIGS. 13 and 14 are timing charts for describing the operation of the present embodiment. Referring to FIG. 13, there are shown a signal (a) representing data inputted to the shift register 12 from the control unit 13, a signal (b) representing an output signal from the shift register 12, a signal (c) designating a value counted by the over-sampling counter 9, a signal (d) showing an output signal from the filter 31, a signal (e) representing an output signal from the filter 32 and a signal (f) indicating a value counted by the bit counter 7. The data inputted to the shift register 12 from the control unit 70 are brought together into a symbol unit (signal b). The bit counter 7 increments a counted value at symbol-unit intervals (signal f). Since the periods of the respective symbols are 7-divided by the over-sampling counter 9 and impulse response values corresponding to the respective periods are to be calculated in the present embodiment, the over-sampling processing is enabled (signal c). In addition, the signals indicative of the phase information, which vary smoothly with the operation of the filters 31, 32, can be outputted (signals d, e).

Figure 14:
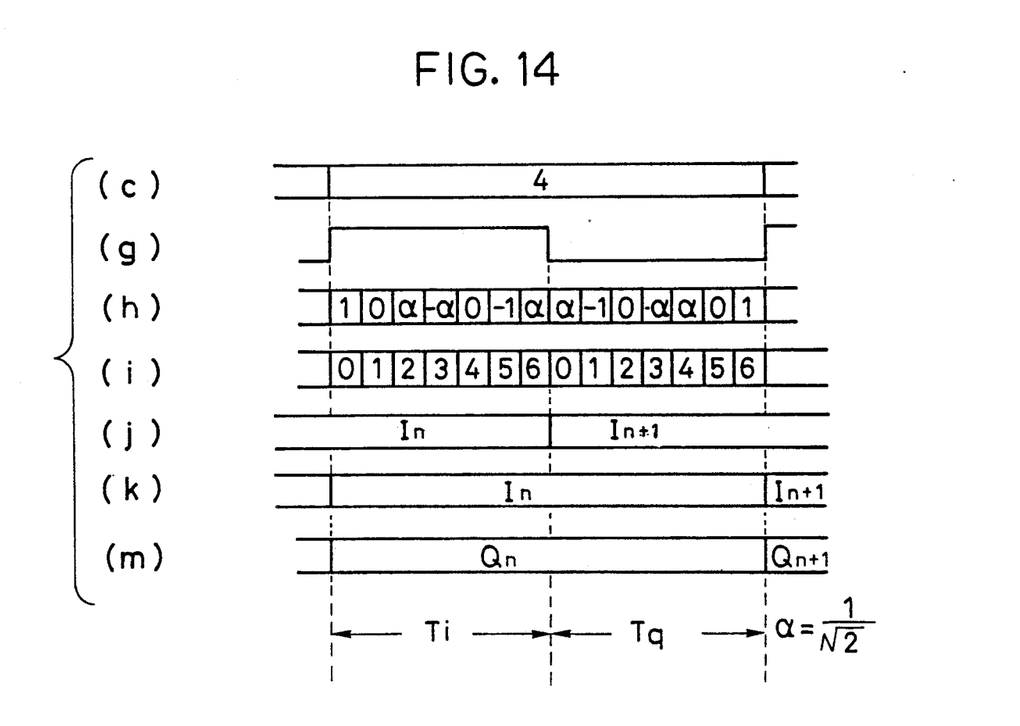

FIG. 14 is an enlarged view of a portion of FIG. 13, the view showing an enlarged period during which the values counted by the over-sampling counter 9 vary. Referring to FIG. 14, there are shown a signal (c) indicative of a value counted by the over-sampling counter 9, a signal (g) representing an output from the time-division control circuit 23, a signal (h) indicating an output from the mapping circuit 1, a signal (i) representative of a value counted by the tap counter 8, a signal (j) representing an output of the latch circuit 19, a signal (k) indicative of an output of the latch circuit 20 and a signal (m) representing an output of the latch circuit 21. When the value counted by the over-sampling, counter 9 is within a predetermined period of time, the output corresponding to one complete cycle is produced from the time-division control circuit 23 (signal g). The tap counter 8 performs a two-cycle operation during this predetermined period (signal i). The mapping circuit 1 outputs I information within the former half of the period and Q information within the latter half of the period correspondingly. It is therefore feasible to calculate the values indicative of the impulse response of two types comprising I and Q information within one over-sampling period. The result of this calculation is held in the latch circuit 19 at the rise of the signal g (signal j), and held in the latch circuits 20, 21 at the fall of the signal g (signals k, m). Thus, the I and Q information can be outputted simultaneously owing to the operations of the latch circuits 19 to 21, and the timing at which the phase of the I information is changed can be in unison with the timing at which the phase of the Q information is changed.

Further, the control unit 70 provides a control signal to the bit counter 7 so as to clear the bit counter 7 in the present embodiment. The present embodiment can therefore bring about an advantageous effect in that the delivery of data is always enabled to start from the same state because the control unit 70 can reset the bit counter 7 at the time of a start in the delivery of the data.

A description will now be made of operations of the addition circuits 24, 26, the registers 25, 27, the amplifying circuits 28, 29 and the gain control circuit 30 shown in FIG. 12.

As shown in FIG. 2, the output from the filter circuit 15, which is represented by the outputs from the filters 31, 32 in FIG. 12 are applied to the quadrature modulating circuit 16, which in turn performs the phase modulation on the signals inputted thereto. The quadrature modulating circuit 16 does not exhibit the ideal characteristic in a practically used circuit, and its characteristic is sometimes deteriorated owing to variations in elements. Since the addition circuits 24, 26 can add the values set in the registers 25, 27 to the phase information in the present embodiment, the off-set balance can be adjusted by suitably setting the contents of the registers 25, 27 with the control unit 70. Further, since the gain control circuit 30 can set the gain of each of the amplifying circuits separately, the variations in the gain can be corrected. It is also possible to considerably reduce trouble required to adjust the gain by setting a control program such that the value to be established by the control unit 70 can be changed when the circuit is in operation. Needless to say, it is also feasible to avoid a deviation in the gain adjusted accidentally when in use by providing an inhibiting arrangement for inhibiting such a change at the time of its operation.

Figure 15:
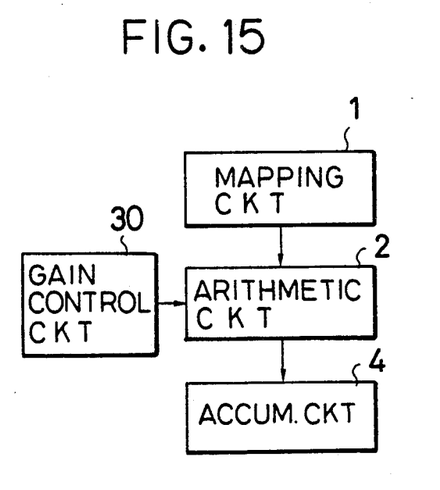
FIGS. 15, 16, and 17 are block diagrams partially showing different embodiments in accordance with the present invention.
Figure 16:
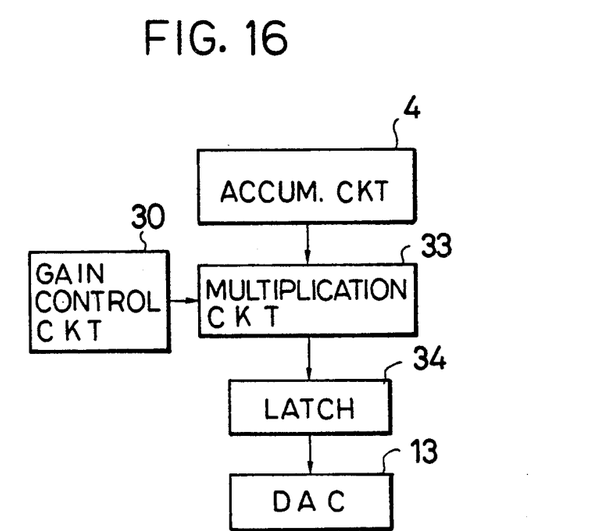

The gain control circuit 30 is activated to control the gain of each of the amplifying circuits 28, 29 in the second embodiment shown in FIG. 12. However, its control can be practiced in the same manner even at other locations. For example, the gain control circuit 30 may also be constructed such that the conversion gain of each of the DACs can be controlled. As a matter of course, each of addresses to be read out from the ROM may be changed by using an output of the gain control circuit 30 in the case where the ROM is employed in the arithmetic circuit 2. The following method may be mentioned as an alternative to the above. Namely, even when an output of the accumulating circuit 4 is multiplied by the output of the gain control circuit 30, the same advantageous effect as described above can be obtained. Examples shown in FIGS. 15 and 16 can bring about an advantageous effect in that the components can easily be integrated into circuits because all the gain controls are carried out by a digital circuit noting that FIG. 16 illustrates a multiplication circuit 33 and a latch circuit 34.

Figure 17:
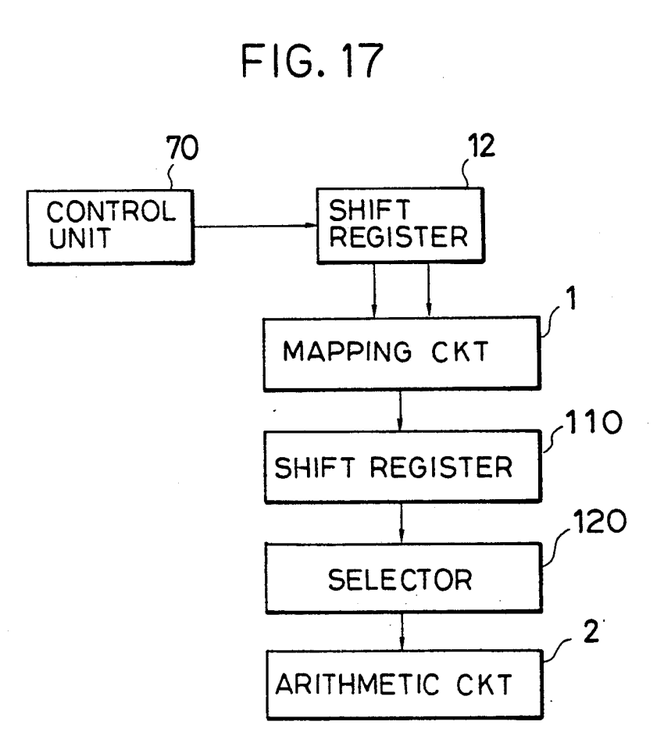

The embodiment illustrated in FIG. 12 can bring about an advantageous effect in that the circuit scale can further be reduced because the filtering processing for the phase information of two types comprising I and Q can be carried out by using a common circuit. In the embodiments of FIGS. 5 and 12 which have been described so far, the selector 10 is disposed at a stage prior to the mapping circuit 1. It is however apparent that the present invention is applicable even in the case where a selector 120 is provided at a stage subsequent to the mapping circuit 1 and the output of the mapping circuit 1 is delayed by the shift register 110 as shown in FIG. 17. In this arrangement, the period at which the mapping circuit 1 is activated becomes the period at which the symbol is inputted. Therefore, the power consumption can be reduced where the circuit is realized by using CMOS elements.

Figure 18:
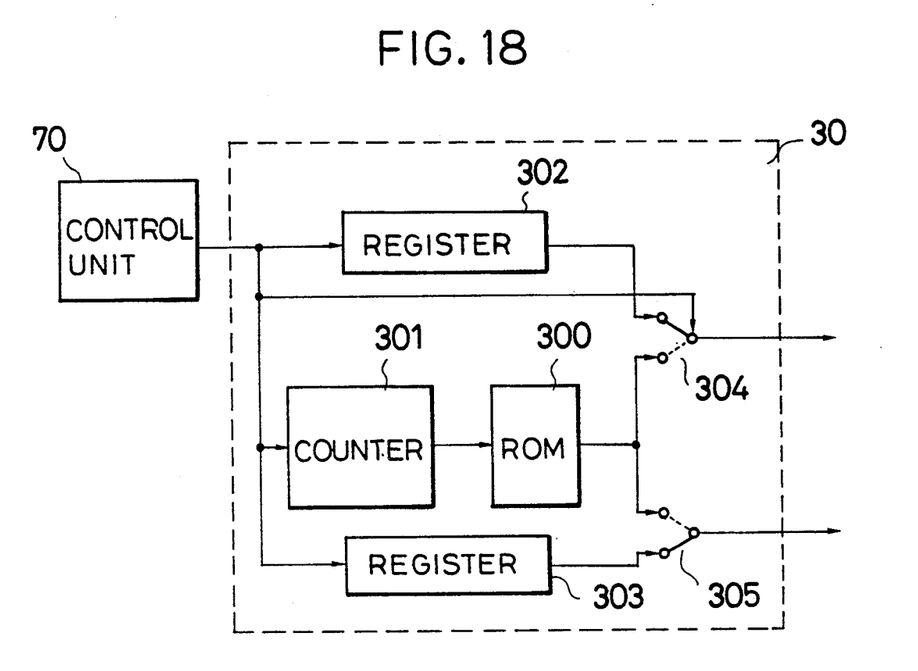
FIG. 18 is a more detailed block diagram of a gain control circuit.

FIG. 18 is a block diagram showing one example of the gain control circuit 30 illustrated in FIG. 12. The control unit 70 can set values for control of the gain of I and Q information to registers 302, 303. It is also possible to control the transmission power by providing a counter 301, a ROM 300 and switching circuits 304, 305.

Figure 19:
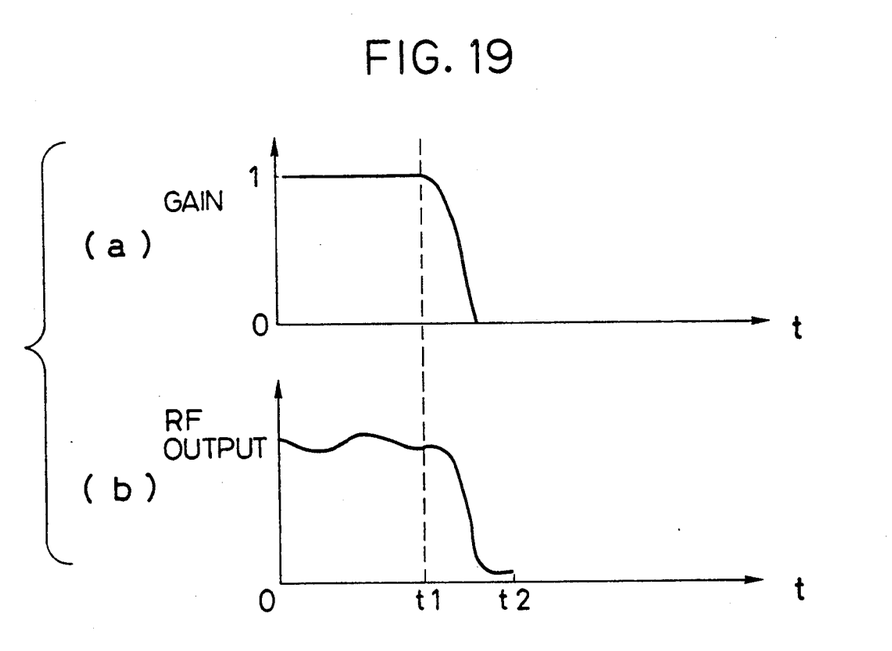
FIG. 19 is a graphic representation showing an operation of the communication apparatus in accordance with the present invention.

FIG. 19 shows one example of a graphical representation for describing the operation for the control of the transmission power. There is shown an example in which the transmission power is rapidly stopped. A TDMA communication system is required to perform such a rapid control of the transmission power. The control unit 70 applies a signal to the counter 301 to activate the same, and switches the switching circuits 304, 305 to the output side of the ROM 300. The output of the counter 301 is connected to an address input of the ROM 300 from which data set in advance are sequentially read out. If the data shown in FIG. 19(a) is written into the ROM 300, the transmission power also varies in accordance with a characteristic curve shown in FIG. 18(b) similarly to that in FIG. 19(a). Even in the case where the value of the output of a gain control circuit 30 is set to 0 in a practically-used circuit, the RF power cannot be set to 0 owing to variations in elements. For this purpose, in the embodiment shown in FIG. 2, the control unit 70 applies a signal to the linear amplifier 17 to permit the turning off of the power supply for the linear amplifier 17. Thus, the value of the output can be set to 0 by turning off the power supply for the linear amplifier 17 at the timing of t2 as shown in FIG. 19. Further, an increase in the transmission power can also be controlled by suitably setting data in the ROM 300. Since the transition of an change in the power can also be set in the ROM 300, the control for suppressing spurious emissions such as harmonic emissions caused by of the output signal from the output control means can be controlled in accordance with the control information stored in the first storing means, the control of the quadrature modulating circuit can easily be effected.

As has been described above, the present invention can bring about advantages in that the phase state can be determined by using the value counted by the bit counter, and since the arithmetic processing of each of the mapping circuit, the arithmetic circuit and the accumulating circuit can be subjected to dispersion, the storage capacity of the ROM can be reduced and the components in these circuits are easily integrated into circuits even when a ROM is utilized for the arithmetic operation.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A $\pi/4$ shift QPSK modulator for receiving digital signals and for outputting a modulated signal therefrom in accordance with each of the inputted digital signals, comprising:
    counting means for counting the number of the inputted digital signals;
    phase information arithmetic means for receiving a value of an output from the counting means and a value of each of the inputted digital signals for outputting phase information of the signal to be modulated;

arithmetic means for performing an arithmetic operation on values representing an impulse response of the output phase information from the phase information arithmetic means and outputting impulse response values in accordance therewith; and accumulating means for accumulating impulse response values outputted from the arithmetic means and for performing an arithmetic operation for enabling generation of a $\pi/4$ shift QPSK modulated signal.

2. A $\pi/4$ shift QPSK modulator according to claim 1, further comprising filter means responsive to an output of the accumulating means for enabling generation of the $\pi/4$ shift QPSK modulated signal.

3. A $\pi/4$ shift QPSK modulator according to claim 1, further comprising means for receiving the inputted digital signals and selecting a value thereof for application to the phase information arithmetic means.

4. A $\pi/4$ shift QPSK modulator according to claim 3, wherein the receiving means includes shift register means for receiving the input digital signals and providing outputs thereof, and selector means for selecting a value of the shift register means for application to the phase information arithmetic means.

5. A $\pi/4$ shift QPSK modulator according to claim 4, further comprising timing means coupled at least to the shift register means and counting means, the counting means including a bit counter coupled to the phase information arithmetic means, a tap counter coupled to the selector means, the phase information arithmetic means, the arithmetic means and the accumulating means, and an over-sampling counter coupled to the arithmetic means and the accumulating means, and filter means coupled to an output of the accumulating means.

6. A $\pi/4$ shift QPSK modulator according to claim 1, further comprising means for selecting output phase information from the phase information arithmetic means and for supplying the selected output phase information to the arithmetic means.

7. A $\pi/4$ shift QPSK modulator according to claim 6, wherein the selecting means includes shift register means for receiving output phase information from the phase information arithmetic means and providing an output indicative thereof and a selector for selecting at least one output from the shift register means for supply to the arithmetic means.

8. A $\pi/4$ shift QPSK modulator according to claim 1, wherein the phase information arithmetic means comprises storage means and address arithmetic means for performing an arithmetic operation on address information in the storage means in accordance with information received by the phase information arithmetic means.

9. A $\pi/4$ shift QPSK modulator according to claim 1, wherein the arithmetic means includes a ROM.

10. A $\pi/4$ shift QPSK modulator according to claim 1, wherein the arithmetic means includes storage means and numeric converting means for one of performing code inversion on a result of an arithmetic operation outputted by the storage means and converting the result of the arithmetic operation outputted by the storage means into a preset value in accordance with a signal received by the arithmetic means.

11. A $\pi/4$ shift QPSK modulator according to claim 1, further comprising control signal receiving means for receiving a control signal from a control signal generating means, and a counting control means for resetting the counting means in accordance with the control signal.

12. A $\pi/4$ shift QPSK modulator according to claim 1, further comprising first storage means for storing control information and output control means for controlling one of an output level and off-set level of an output of the accumulation means in accordance with the control information stored in the first storage means.

13. A $\pi/4$ shift QPSK modulator according to claim 12, wherein the output control means includes second storage means for storing a series of control information which has been preset, reading means for sequentially reading the control information from the second storage means, and control switching means for performing switching on one of control of the reading means in accordance with the control information stored in the first storage means and control of the reading means in accordance with the control information read from the second storage means and for controlling the operation of the reading means.

14. A communication apparatus comprising the $\pi/4$ shift QPSK modulator according to claim 1, the communication apparatus including means for at least one of transmitting and receiving the $\pi/4$ shift QPSK modulated signal.

15. A communication apparatus comprising the $\pi/4$ shift QPSK modulator according to claim 2, the communication apparatus including means for at least one of transmitting and receiving the $\pi/4$ shift QPSK modulated signal, the transmitting means including quadrature modulator means coupled to the output of the filter means.

* * * * *